Patented Oct. 1, 1935

2,015,668

UNITED STATES PATENT OFFICE 2,015,668

MANUFACTURE OF ALKALI METAL CYANIDES

Harvey N. Gilbert, Niagara Falls, N. Y., assignor to The E. I. du Pont de Nemours & Company, Incorporated, Wilmington, Del., a corporation of Delaware No Drawing. Application February 16, 1933, Serial No. 657,109

11 Claims. (Cl. 23—79)

This invention relates to the production of alkali metal cyanides, specifically sodium cyanide, from calcium cyanamide.

It has previously been proposed to convert calcium cyanamide to alkali metal cyanide by fusion with fluxes of various sorts, such as sodium chloride, sodium cyanide and other sodium compounds. A more recent proposal has been to convert calcium cyanamide to sodium cyanide by the reaction of elemental sodium with the cyanamide according to the following equation:

$$Na_2 + CaCN_2 + C = 2NaCN + Ca$$

As a source of calcium cyanamide for this reaction and the other reactions there has been used the commercial product known by that name or by the name of "lime nitrogen". This material contains various amounts of pure calcium cyanamide, usually about 60–66%. Hereafter when I speak of calcium cyanamide I refer to this crude product containing various amounts of the pure cyanamide and the residual material left during its preparation, such as calcium carbide, calcium oxide, free carbon etc. Further discussion of the invention will be illustrated by sodium as the alkali metal, but this is to be taken as representative since potassium or lithium can equally well be used.

In the reaction shown by the above equation the calcium cyanamide by interaction with the carbon and sodium gives theoretically two moles sodium cyanide for each mole calcium cyanamide or each mole of calcium. In the process heretofore proposed this calcium has been unutilized in that in the reaction itself or in the subsequent operations such as dissolving in water, it has been converted to calcium oxide or other unusable calcium compounds. Furthermore, the elemental calcium in the product is a potential source of difficulty.

An object of this invention is to improve upon the use of calcium cyanamide according to the above reaction by making use of the elemental calcium and converting it to a usable product. A further object is to produce sodium cyanide efficiently; and a further object is to produce acetylene from the reaction mass.

I accomplish these objects by having sufficient carbon present during the reaction to provide sufficient carbon for each mole of calcium cyanamide to be converted, and carrying out the reaction at such temperature, that some of the carbon will combine with the elemental calcium to produce calcium carbide in the reaction product.

The balanced equation for this reaction will be as follows:

$$Na_2 + CaCN_2 + 3C = 2NaCN + CaC_2$$

As will be seen from this reaction I preferably supply three or more moles of carbon for each mole of cyanamide. The crude product produced by this means then contains sodium cyanide, calcium carbide formed in the reaction, calcium carbide that may have carried over from the crude cyanamide used, together with the other inert materials, such as calcium oxide, which may have been present in the raw material or which may have been formed by decomposition during the reaction. The crude product usually contains from about 10% to about 30% of calcium carbide, depending upon the proportions of the various reactants used and upon the temperature at which the reaction is carried out.

I have found that this reaction may be carried out at a temperature above red heat and that between 700° and 1000° C. it takes place very readily; I prefer to heat the reactants to about 900° C. The boiling point of sodium is approximately 877° C. so that at the optimum reaction temperatures the sodium is very easily disseminated to all parts of the reaction mass as a vapor. I have also found that the sodium is very readily absorbed by the reaction mixture so that it is not necessary that the sodium be intimately mixed with the cyanamide and carbon before subjecting to reaction temperature when the reaction is carried out at a temperature of 900° C. Thus I have found that sodium may be placed in the bottom of a vessel and covered with the reaction mixture of cyanamide and carbon, then, when sufficiently heated, the sodium vapor will permeate the mass and react; or it is possible to generate the sodium vapors apart from the reaction vessel and lead it into the cyanamide-carbon mixture. For reactions at lower temperatures, the sodium may be added in solid or liquid form and the mixture stirred to uniformity at temperatures above the melting point of sodium.

Crude calcium cyanamide or lime nitrogen, as noted above, contains one mole of free carbon for each mole of cyanamide. Thus, theoretically, I would add, according to the above equation, two moles of carbon for each mole of pure calcium cyanamide contained in the lime nitrogen and the further carbon necessary would come from the crude. I have found, however, that it is preferable to have a slight excess of carbon and further that probably the carbon in the lime nitrogen is not as reactive as other more desirable carbons so that I prefer to add the three moles of carbon, as shown by the equation, in addition to the carbon already present. This, however, is not necessary and I do not wish to be restricted to this mode of operation but only to adding sufficient carbon to form calcium carbide in an efficient manner from the calcium released.

The carbon used in the reaction may be any suitable form of carbon free of deleterious materials which would react with the other constituents to any appreciable extent to form products other than sodium cyanide; thus I preferably use wood charcoal although other forms are suitable. The carbon is first finely ground and then mixed with the calcium cyanamide before subjecting to reaction.

The following examples will illustrate my invention.

Example I 46 grams of sodium were placed in the bottom of an iron reaction vessel 1½ inches in diameter and 8 inches deep. Over this was placed a mixture formed of 121 grams of calcium cyanamide crude and 12 grams wood charcoal. This provided for approximately 2 moles of carbon per mole of $CaCN_2$ actually present. The reaction vessel was placed in a molten lead bath which was at a temperature of 791° C. at the start but which was raised over a period of 17 minutes to a temperature of 923° C. There was no violence during the reaction. A small cover of asbestos in the end of the reaction vessel was forced out by gases evolved. The resulting product was friable, gray in color and when added to water reacted very vigorously, evolving acetylene. The yield of sodium cyanide was equivalent to about 73% of the theoretical based on the pure cyanamide in the crude. The yield calculated on the basis of the sodium used was also about 73%.

Example II 46 grams of sodium were placed in the bottom of a reaction vessel as used in Example I and over this was placed a charge of 121 grams of crude calcium cyanamide previously mixed with 36 grams finely divided wood charcoal. The reactor was placed in a molten lead bath as before. The lead bath at the start was just over 900° C. but was gradually raised in temperature over a period of 30 minutes to 1013° C. The product was then removed and cooled. Due to the presence of approximately one mole of carbon in the crude calcium cyanamide, an excess was present in this run. The mixture before the reaction was black in color and the product was gray. There was an evolution of hydrogen noticed which was probably due to the action of the sodium on moisture in the crude. The product reacted vigorously with water and evolved considerable amounts of gas which burned with a yellowish smoky flame and gave off the odor of acetylene. The product did not fuse during the reaction but was present as a friable adherent mass and was easily removed and pulverized. The reaction product was pulverized and then stirred into an aqueous solution of sodium carbonate to precipitate the lime and form sodium cyanide solution and generate acetylene gas. Analysis of the product showed a 97% yield of nitrogen as sodium cyanide based on the original nitrogen in the cyanamide; the yield was also 97% based on the sodium used; a 51% yield of calcium carbide was obtained, based on the theoretical amount of calcium to be evolved. The actual content of calcium carbide in the reaction product, corresponding to the aforementioned yield, was 16% by weight. This calcium carbide was determined by the amount of acetylene evolved on immersing the product in water.

Example III

A mixture the same as that used in the preceding example was placed in the reactor and maintained at about 900 C. for 17 minutes. A yield of sodium cyanide equivalent to 86.8% of the theoretical based on the nitrogen in the crude cyanamide or on the sodium was obtained, and there was a 75.8% yield of acetylene based on the theoretical. The corresponding percentage of calcium carbide present in the reaction product was 24% by weight.

Example IV

A mixture as used in Example II was placed in a reactor and maintained at 900° C. for 42 minutes. A yield of 92% sodium cyanide was obtained and 61.5% of theoretical of acetylene. The corresponding percentage of calcium present in the reaction product was 19.4% by weight.

While I show this reaction as taking place in a simple iron reactor it can also be run in any other apparatus suited for the materials and the temperature used.

As indicated in Example II, the crude material resulting from this reaction may be dissolved in water and treated with soda ash to precipitate the lime, filtered and thus give a solution of sodium cyanide from which the cyanide can be recovered by any suitable means.

I claim:

1. Process of producing alkali metal cyanide and calcium carbide which comprises reacting above red heat calcium cyanamide and alkali metal in the metallic state in the presence of more than one mole of total free carbon for each mole of pure calcium cyanamide.

2. Process of producing alkali metal cyanide and calcium carbide which comprises reacting above 700° C. calcium cyanamide, alkali metal in the metallic state and carbon, the free total carbon present being sufficient to provide more than one mole of carbon for each mole of pure calcium cyanamide.

3. Process of producing alkali metal cyanide and calcium carbide which consists in heating to between 700° and 1000° C. a mixture of crude calcium cyanamide, alkali metal in the metallic state and carbon, the total free carbon present being sufficient to provide more than one mole of carbon for each mole of calcium combined as calcium cyanamide.

4. Process of producing alkali metal cyanide and calcium carbide which consists in heating to a temperature between 700° and 1000° C. a mixture of crude calcium cyanamide and carbon and treating the mixture at that temperature with alkali metal in the metallic state, the total free carbon present being sufficient to provide three moles of carbon for each mole of calcium combined as calcium cyanamide.

5. Process of producing sodium cyanide and calcium carbide which comprises reacting above red heat calcium cyanamide and sodium in the metallic state in the presence of more than one mole of total free carbon for each mole of pure calcium cyanamide.

6. Process of producing sodium cyanide and calcium carbide which comprises reacting above 700° C. calcium cyanamide, sodium in the metallic state and carbon, the total free carbon present being sufficient to provide more than one mole of carbon for each mole of pure calcium cyanamide.

7. Process of producing sodium cyanide and calcium carbide which consists in heating to between 700° and 1000° C. a mixture of crude calcium cyanamide, sodium in the metallic state and carbon, the total free carbon present being sufficient to provide more than one mole of carbon for each mole of calcium combined as calcium cyanamide.

8. Process of producing sodium cyanide and calcium carbide which consists in heating to a temperature between 700° and 1000° C. a mixture of crude calcium cyanamide and carbon and treating the mixture at that temperature with sodium in the metallic state, the total free carbon present being sufficient to provide three moles of carbon for each mole of calcium combined as calcium cyanamide.

9. Process for the production of alkali metal cyanide and acetylene which comprises treating a mixture of calcium cyanamide and carbon at a temperature of over 700° C. with alkali metal in the metallic state, the total free carbon present being sufficient to provide more than one mole of carbon for each mole of calcium combined as calcium cyanamide, leaching the resultant product with water and treating with alkali metal carbonate, so as to evolve acetylene from the calcium carbide present and precipitate the calcium compound, and filtering to provide an aqueous solution of alkali metal cyanide.

10. Process for the production of sodium cyanide and acetylene which comprises treating a mixture of calcium cyanamide and carbon at a temperature of over 700° C. with sodium in the metallic state, the total free carbon present being sufficient to provide more than one mole of carbon for each mole of pure calcium cyanamide, leaching the resultant product with water and treating with sodium carbonate so as to evolve acetylene from the calcium carbide present and precipitate calcium compounds, and filtering to provide an aqueous solution of sodium cyanide.

11. Process for the production of sodium cyanide and acetylene which comprises treating a mixture of calcium cyanamide and carbon at a temperature of between 700° C.–1000° C. with sodium in the metallic state, the total free carbon present being sufficient to provide three moles of carbon for each mole of pure calcium cyanamide, leaching the resultant product with water and treating with sodium carbonate so as to evolve acetylene from the calcium carbide present and precipitate calcium compounds, and filtering to provide an aqueous solution of sodium cyanide.

HARVEY N. GILBERT.